Feb. 21, 1967 K. V. EISBERG 3,304,742
ABSORPTION REFRIGERATION SYSTEMS
Filed July 28, 1965
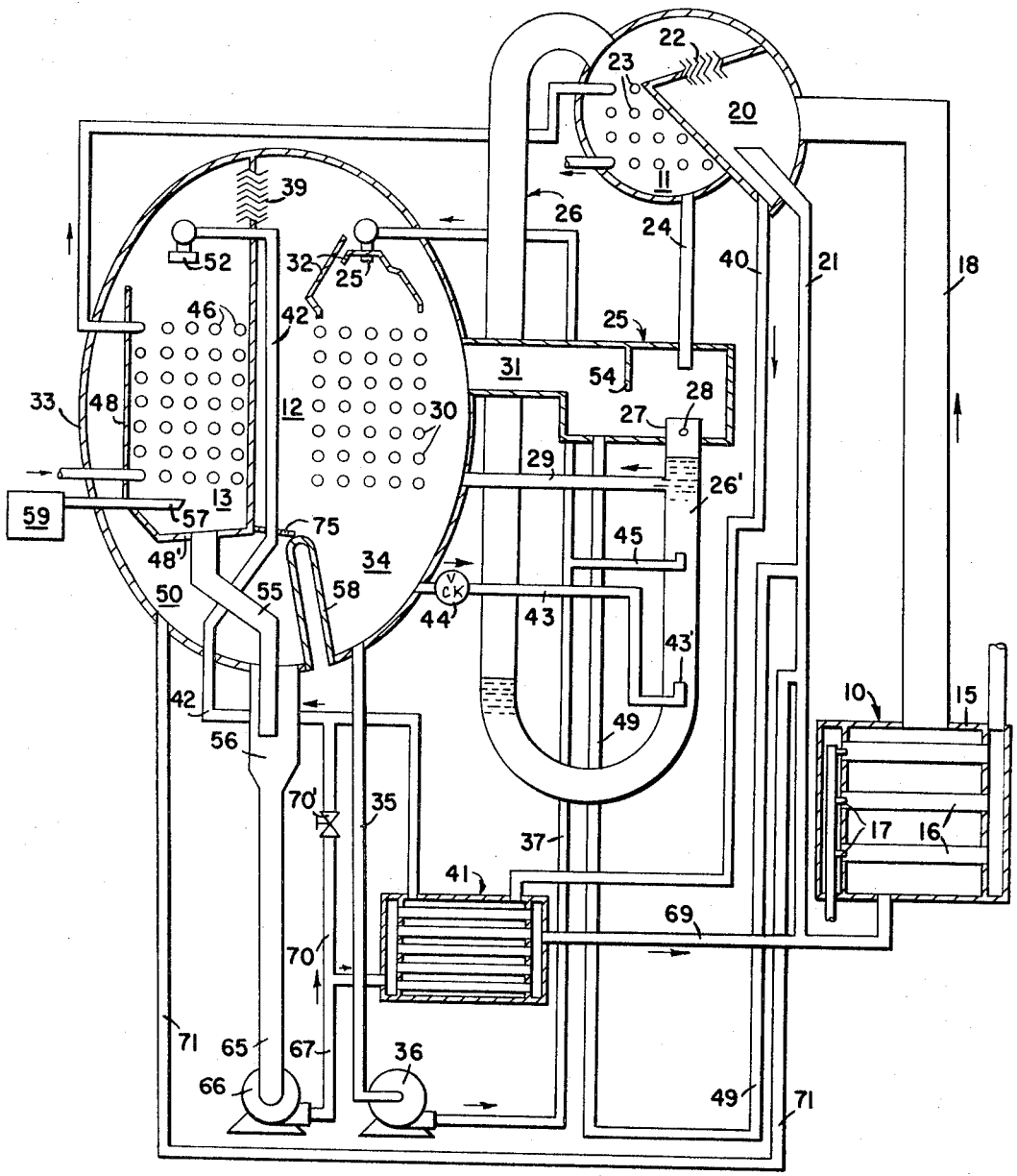
INVENTOR.
KEITH V. EISBERG.
BY
*Frederick E. Mc Mullen*
ATTORNEY.

United States Patent Office 3,304,742
Patented Feb. 21, 1967

3,304,742
ABSORPTION REFRIGERATION SYSTEMS
Keith V. Eisberg, Camillus, N.Y., assignor to Carrier Corporation, Syracuse, N.Y., a corporation of Delaware
Filed July 28, 1965, Ser. No. 475,492
8 Claims. (Cl. 62—476)

This invention relates to absorption refrigeration systems and, more particularly, to an absorption refrigeration system adapted to heat as well as cool.

It is a principal object of the present invention to provide a new and improved absorption refrigeration system.

It is a further object of the present invention to provide an absorption refrigeration system capable of heating as well as cooling.

It is an object of the present invention to provide an absorption refrigeration system readily convertible from cooling to heating cycle operation or vice versa without appreciable delay.

It is an object of the present invention to provide an absorption refrigeration system adapted to cool or heat in which operation of the system circulating pumps during the heating cycle is rendered unnecessary and in which the need for changeover valves to ready the system for cooling or heating cycle operation is obviated.

It is a further object of the present invention to provide an improved absorption refrigeration system incorporating a novel arrangement for establishing a liquid seal by means of the refrigerant during cooling cycle operation to maintain requisite system pressure differentials while permitting, upon dissipation of the liquid seal, operation on the heating cycle. Other objects of the invention will be readily perceived from the following description.

This invention relates to an absorption refrigeration system adapted to heat as well cool comprising, in combination, a generator section, a condenser section, an evaporator section including a sump, and an absorber section operatively interconnected one to the other in a closed system; a refrigeration separating chamber between the condenser section and the evaporator section; first conduit means connected between the condenser section and the separating chamber, the first conduit means being adapted to hold liquid refrigerant during cooling cycle operation whereby a liquid seal is established in the first conduit means, gaseous refrigerant driving the liquid refrigerant from the first conduit means into the separating chamber during system heating cycle operation; and means for passing liquid refrigerant from the evaporator section sump during heating cycle operation to the generator section including second conduit means connected between the evaporator section sump and the first conduit means, the second conduit means being adapted to convey liquid refrigerant from the evaporator section sump into the stream of gaseous refrigerant passing through the first conduit means whereby the gaseous refrigerant carries the liquid refrigerant into the separating chamber; the second conduit means including a check valve effective to prevent flow of refrigerant from the first conduit means through the second conduit means into the evaporator section sump; and third conduit means between the separating chamber and the generator section adapted to convey liquid refrigerant from the separating chamber to the generator section.

The attached drawing illustrates a preferred embodiment of the invention in which:

The figure is a diagrammatic view of an absorption refrigeration system incorporating the refrigerant control means of the present invention.

The absorption refrigeration system of the present invention preferably employs water as the refrigerant and a solution of lithium bromide as the absorbent solution although other refrigerants and absorbents may be employed. As used herein, the term "strong solution" refers to a concentrated solution of lithium bromide which is strong in absorbing power; the term "weak solution" refers to a dilute solution of lithium bromide which is weak in absorbing power.

Referring to the attached drawing there is shown an absorption refrigeration system including a generator section 10, a condenser section 11, an evaporator section 12 and an absorber section 13 interconnected to provide refrigeration or heating. The evaporator and the absorber sections are placed within a horizontally extending, substantially cylindrical shell 33, as hereinafter described.

Generator section 10 comprises a shell 15 having a plurality of fire tubes 16 passing therethrough. Gas jets 17 supply an ignited mixture of gas and air into fire tubes 16 to heat weak solution. A vapor lift tube 18 extends from the top of shell 15. Weak solution is heated in generator section 10 to boil off refrigerant vapor thereby concentrating the weak solution. A mixture of concentrated absorbent solution and refrigerant bubbles rises upwardly through vapor lift tube 18 and passes into separator chamber 20. Equalizer line 21, connecting the bottom of generator 10 and separator 20, serves to return the concentrated absorbent solution to generator 10 during system heating cycle operation and assists in stabilizing the generator boiling.

Preferably, condenser section 11 is contained in the same shell as separator chamber 20 and comprises a plurality of heat exchange tubes 23. During refrigeration cycle operation, a suitable cooling medium such as water passes through condenser tubes 23. Refrigerant vapor separates from the mixture of absorbent solution passed to separator chamber 20 and passes to condenser section 11 through eliminators 22. The refrigerant vapor is condensed to liquid refrigerant in condenser section 11 by the cooling medium passing through tubes 23. Liquid refrigerant from condenser section 11 passes through line 24 to heating cycle separator 25.

Heating cycle separator 25, which is comprised of a closed generally rectangular housing, communicates with condenser section 11 by means of a relatively large conduit 26. Conduit 26, having a generally U-shape, serves during refrigeration cycle operation as a trap for liquid refrigerant which effectively forms a liquid seal during cooling cycle operation. Leg 26' of conduit 26 functions as a vapor lift tube, as will be more apparent hereinafter.

Leg 26' of conduit 26 is disposed in substantial alignment with line 24. The terminal end 27 of leg 26' protrudes within heating cycle separator 25. Opening 28 is formed in the wall of terminal end 27 of conduit 26 adjacent the base of heating cycle separator 25.

Line 29 connects the upper portion of leg 26' of conduit 26 with evaporator section 12. A relatively large conduit 31 connects heating cycle separator 25 with evaporator section 12.

Evaporator section 12 comprises a plurality of longitudinally extending heat exchange tubes 30 disposed in a tube bundle located in a region of shell 33. Water or other heat exchange fluid to be cooled or heated is passed through tubes 30 in heat exchange relation with refrigerant supplied over the exterior surfaces of the tubes. The heat exchange effected between the water to be cooled or heated by the refrigerant cools or warms the water in tubes 30 while vaporizing or condensing refrigerant on the exterior surfaces of the tubes. During cooling cycle operation the resulting vaporized refrigerant passes from evaporator section 12 into absorber section 13 carrying with it the heat absorbed from the water passed through tubes 30. During heating cycle operation, the condensed refrigerant accumulates in evaporator section sump 34 for return to generator 10 in the manner to be explained hereinafter. The chilled or heated water in tubes 30 may be circulated to a place of use as desired.

Baffles 32 are provided to direct refrigerant vapor from the spray nozzles 25 toward the tube bundle in the evaporator section. Eliminators 39 may be provided in the path between absorber section 13 and evaporator section 12.

Liquid refrigerant entering evaporator section 12 from heating cycle separator 25 by means of line 29 as well as unevaporated liquid refrigerant accumulates in sump 34 and, during cooling cycle operation passes through line 35, pump 36 and line 37 to nozzles 25 where it is discharged over the top of the tube bundle in the evaporator section.

During cooling cycle operation, strong solution from the lower portion of separator chamber 20 passes through strong solution line 40 and heat exchanger 41, where it is placed in heat exchange relation with weak solution passing to generator 10 through line 69, to spray nozzles 52 in the absorber. Spray nozzles 52 distribute the strong solution over longitudinally extending tubes 46 to wet the absorber tubes. Absorber section 13 is contained in shell 33.

Cooling water or other suitable cooling medium is passed through tubes 46 to cool the absorbent solution sprayed on their exterior surfaces.

A partition or baffle member 48 is disposed about the sides and bottom of the tube bundle in the absorber section. The lower part 48' of baffle 48 forms a sump funneling weak solution from the absorber section into absorber discharge conduit 55 and solution line 71. Discharge conduit 55 opens into outlet 56.

The liquid refrigerant in sump 34 and the weak solution in sump 50 are at different temperatures. To maintain physical as well as thermal separation therebetween, the base of shell 33 is provided with a longitudinally extending upstanding partition member 58. Baffle 75 is secured between member 58 and the lower portion of baffle member 48 to complete the separation of evaporator section 12 from absorber section 13.

A purge line 57 connected to a suitable purge unit 59 may be provided adjacent the lower portion of the tube bundle in absorber section 13.

Absorbent solution is withdrawn from the absorber section through weak solution line 65 connected to outlet 56 of the absorber section. Weak solution is forwarded by pump 66 through line 67, heat exchanger 41 and line 69 to equalizer line 21 where it passes to generator section 10 for reconcentration. If desired, a portion of the weak solution discharged by pump 66 may be passed through weak solution recirculating line 70 to mix with concentrated absorbent solution in line 42 for discharge through spray nozzles 52. Valve 70' in line 70 regulates the flow of weak solution through recirculating line 70.

Solution line 71, provided between equalizer line 21 and collection sump 50, maintains the proper solution level in generator section 10 when the machine is placed in operation.

Line 43 is connected between the lower portion of leg 26' of conduit 26 and evaporator section sump 34. Line 43, which communicates with sump 34 at a selected refrigerant level, includes a check valve control means 44 effective to limit flow of liquid therethrough to the direction shown by the solid line arrow in the drawing. As will be more apparent hereinafter, condensed refrigerant in sump 34 flows during operation of the system on the heating cycle through line 43 into the stream of gaseous refrigerant passing through leg 26' of conduit 26 to heating cycle separator 25. To render the vapor lift action more effective, the terminal end 43' of line 43 is arranged within conduit 26.

Line 45 connects refrigerant line 37 with leg 26' of conduit 26. The junction of line 45 with conduit 26 is slightly below the junction of line 29 therewith. Line 49 connects heating cycle separator 25 with equalizer line 21.

The junction of line 49 with equalizing line 21 is above the point where line 43 communicates with evaporator section sump 35.

During operation of the system on the cooling cycle pressures prevailing in condenser section 11 are greater than pressures prevailing in the heating cycle separator 25. Liquid refrigerant in condenser section 11 passes through line 24 into the heating cycle separator 25 where, due to the pressure differential prevailing between section 11 and separator 25, the liquid refrigerant is flashed cooled. Gaseous refrigerant passes through conduit 31, evaporator section 12 and baffles 39 into absorber section 13. Liquid refrigerant passes into conduit 26 and through line 29 into the evaporator section 12.

During system cooling cycle operation, liquid refrigerant is trapped in conduit 26 and forms a liquid seal. Due to the pressure differential between condenser section 11 and heating cycle separator 25 liquid refrigerant is held in leg 26' of conduit 26 as generally shown in the drawing.

To facilitate establishment of the aforementioned refrigerant liquid seal in conduit 26 during cooling cycle operation a portion of the liquid refrigerant discharged by pump 36 into line 37 for distribution by nozzles 25 over heat exchange tubes 30 passes through line 45 to leg 26' of conduit 26.

Liquid refrigerant in leg 26' of conduit 26 passes through line 29 into evaporator section 12 where the liquid refrigerant accumulates in the evaporator sump 34. There, liquid refrigerant drawn through line 35 by pump 36 is discharged through nozzles 25 over heat exchanger tubes 30, the resulting heat exchange between the liquid passing through tubes 30 cooling the liquid while vaporizing the refrigerant. The vaporized refrigerant passes through baffles 39 to absorber section 13 where it is absorbed by the relatively strong solution discharged over absorber tubes 46 by nozzles 52. Relatively weak solution from absorber 13 returns via lines 55, 56, 65, pump 66, line 67, heat exchanger 41 and line 69 to generator 10 to complete the cooling cycle.

Opening 28 in conduit 26 limits the refrigerant liquid level in heating cycle separator 25, the refrigerant overflowing into leg 26' of conduit 26. Check valve 44 in line 43 prevents backflow of liquid refrigerant from leg 26' of conduit 26 into evaporator section sump 34 during system cooling cycle operation.

To initiate heating cycle operation, the flow of cooling water to absorber section heat exchanger tubes 46 and condenser section tubes 23 is terminated by suitable means (not shown). Pumps 36, 66 are idle.

At the initiation of system heating cycle operation pressures developed by the vaporous refrigerant emitted from generator section 10 in condenser section 23 drive liquid refrigerant in conduit 26 therefrom into heating cycle separator 25 and evaporator section 12. With conduit 26 open, gaseous refrigerant from condenser section 11 passes through conduit 26, heating cycle separator 25 and conduit 31 into the evaporator section 12 where heat transfer between the relatively hot gaseous refrigerant and the conditioning medium passing through heat exchanger tubes 30 heats the conditioning medium while condensing the refrigerant. It is understood that upon the destruction of the liquid seal within conduit 26, pressures between condenser section 23 and heating cycle separator 25 substantially equalize.

Condensed refrigerant accumulates in evaporator section sump 34 from whence it passes through line 43 and check valve 44 into the stream of vaporous refrigerant rising through leg 26' of conduit 26 to heating cycle separator 25. Gaseous refrigerant flowing through leg 26' of conduit 26 to separator 25 carries droplets of liquid refrigerant emitted from line 43 into heating cycle separator 25 wherein the liquid refrigerant separates therefrom and returns through line 49 and equalizer line 21 to generator section 10. The junction of line 41 with equalizing line 21 is above the usual liquid level prevailing in line 21 during system heating cycle operation.

During system heating cycle operation, strong absorbent solution separated from the gaseous refrigerant in separator 20 returns through equalizing line 21 to generator section 10. Liquid refrigerant from return line 49 is carried therewith into generator section 10 where upon vaporization it passes through vapor lift tube 18 into separator 20 and condenser section 23.

Strong solution entering line 40 passes through heat exchanger 41, line 42 and spray nozzles 52 into the absorber section 13. From the absorber section, the solution may pass through line 71 into equalizing line 21 and generator 10. Other solution from absorber section 13 may pass via lines 55, 65, 67, heat exchanger 41 and line 69 to generator section 10. Pump 66, which is inoperative during system heating cycle operations, permits the solution to flow freely therethrough.

Preferably, pump 66 is energized for a relatively short interval prior to or at the initiation of the system heating cycle to reduce solution concentration in generator section 10. Reduction in solution concentration in the generator section reduces the temperature required to establish sufficient vapor pressure to drive liquid refrigerant from conduit 26 at the start of heating cycle operation.

The disproportionate sizes of line 24 and conduit 26 limit the amount of vaporous refrigerant that may pass through line 24 to heating cycle separator 25 during the heating cycle operation. Liquid refrigerant, during heating cycle operation, is trapped in line 35 to establish a liquid seal therewithin. Baffle 54 in heating cycle separator 25 prevents carryover of liquid refrigerant into conduit 31 and evaporator section 13.

By the present invention there is provided an absorption refrigeration system effective to heat or cool. During heating cycle operation, the absorption system of the present invention obviates the need for using the system circulating pump mechanism yet nevertheless establishes a positive feed to the system generator. Further, the present system does not require extra solution for heating cycle operation. And, by the use of refrigerant as the system heat transfer medium, relatively low solution temperatures prevail throughout the system during heating cycle operation.

While I have described a preferred embodiment of the invention, it will be understood that the invention is not limited thereto since it may be otherwise embodied within the scope of the following claims.

I claim:

1. In an asorption refrigeration system adapted to heat as well as cool having a generator section, a condenser section, an evaporator section including a sump, and an absorber section operatively interconnected one to the other in a closed system, and a refrigeration separating chamber between the condenser section and the evaporator section, the combination of first conduit means connected between the condenser section and the separating chamber, said first conduit means being adapted to hold liquid refrigerant during cooling cycle operation whereby a liquid seal is established in said first conduit means, gaseous refrigerant driving said liquid refrigerant from said first conduit means into said separting chamber during system heating cycle operation; and means for passing liquid refrigerant from said evaporator section sump to said generator section during heating cycle operation including second conduit means between said evaporator section sump and said first conduit means, said second conduit means being arranged to convey liquid refrigerant from said evaporator section sump into the stream of gaseous refrigerant passing through said first conduit means whereby said gaseous refrigerant carries said liquid refrigerant into said separating chamber; said second conduit means including valve means effective to prevent flow of refrigerant from said first conduit means through said second conduit means into said evaporator section sump; and third conduit means between said separating chamber and said generator section adapted to convey liquid refrigerant from said separating chamber to said generator section.

2. The absorption refrigeration system according to claim 1 including pump means effective during cooling cycle operation to withdraw liquid refrigerant from said evaporator section sump, and fourth conduit means communicating the discharge side of said pump means with said first conduit means to facilitate filling of said first conduit means with liquid refrigerant during cooling cycle operation.

3. The absorption refrigeration system according to claim 2 including means for limiting the quantity of liquid refrigerant in said separating chamber, said limiting means being adapted to pass excess liquid refrigerant in said separating chamber into said evaporating section.

4. The absorption refrigeration system according to claim 1 including baffle means in said separating chamber to prevent carryover of liquid refrigerant into said evaporator section.

5. The absorption refrigeration system according to claim 1 including fifth conduit means communicating said condenser section with said separating chamber, said fifth conduit means opening into said separating chamber substantially opposite the junction of said first conduit means with said separating chamber whereby liquid refrigerant emitted from said fifth conduit means during cooling cycle operation may pass directly into said first conduit means.

6. In an absorption refrigeration system adapted to heat as well as cool having a generator section, a condenser section operatively connected to said generator section, said condenser section including a sump, an evaporator section including a sump, and an absorber section operatively connected between said evaporator section and said generator section, the combination of a separating chamber arranged at a level below the level of said condenser section, a first conduit leading from said condenser section sump, said first conduit opening into said separating chamber, a second conduit leading from said condenser section, said second conduit having an upwardly rising leg opening into said separating chamber substantially opposite said first conduit, a third conduit between said second conduit leg and said evaporator section; during system cooling cycle operation refrigerant from said condenser section sump passing through said first conduit into said second conduit to fill said second conduit leg and pass through said third conduit into said evaporator section, a fourth conduit between said separating chamber and said evaporator section, the dimension of said second and fourth conduits being greater than the dimensions of said first and third conduits to accommodate flow of gaseous refrigerant through said second and fourth conduits during heating cycle operation while restricting flow of gaseous refrigerant through said first and third conduits, a fifth conduit leading from said evaporator section sump, said fifth conduit opening into said second conduit leg, liquid refrigerant from said fifth conduit being carried through said second conduit leg into said separating chamber by gaseous refrigerant during system heating cycle operation, and a sixth conduit between said separating chamber and said generator section for conducting liquid refrigerant from said separating chamber to said generator section during system heating cycle operation.

7. The absorption refrigeration system according to claim 6 in which said fifth conduit includes a check valve adapted to prevent flow of refrigerant from said second conduit through said fifth conduit to said evaporator section sump.

8. The absorption refrigeration system according to claim 7 in which the junction of said fifth conduit with said second conduit leg is below the junction of said third conduit with said second conduit leg, pump means effective during cooling cycle operation to withdraw refrigerant from said evaporator section sump, and a seventh conduit connecting the discharge side of said pump means with said second conduit leg, the junction of said seventh conduit with said second conduit leg being between the junction of said third and fifth conduits with said second conduit leg.

References Cited by the Examiner

UNITED STATES PATENTS

| | | | |
|---|---|---|---|
| 1,846,006 | 2/1932 | Knight | 62—486 X |
| 1,901,458 | 3/1933 | Lenning | 62—486 X |
| 2,223,752 | 12/1940 | Ullstrand | 62—476 X |
| 2,307,165 | 1/1943 | Siedle | 62—488 X |
| 2,640,331 | 6/1953 | Backstrom | 62—486 |
| 2,645,908 | 7/1953 | Backstrom | 62—486 X |
| 2,664,717 | 1/1954 | Backstrom | 62—486 X |

LLOYD L. KING, *Primary Examiner.*